April 16, 1968 R. H. EATON 3,377,877
ADJUSTABLE-INDEX GEAR TRAIN
Filed Oct. 13, 1966 2 Sheets-Sheet 1

INVENTOR.
RICHARD H. EATON
BY
ATTORNEY.

April 16, 1968  R. H. EATON  3,377,877
ADJUSTABLE-INDEX GEAR TRAIN
Filed Oct. 13, 1966  2 Sheets-Sheet 2

INVENTOR.
RICHARD H. EATON
BY
ATTORNEY.

United States Patent Office 3,377,877
Patented Apr. 16, 1968

3,377,877
ADJUSTABLE-INDEX GEAR TRAIN
Richard H. Eaton, Ormond Beach, Fla., assignor to General Electric Company, a corporation of New York
Filed Oct. 13, 1966, Ser. No. 586,501
5 Claims. (Cl. 74—395)

This invention relates to a gear train in which the driver gear is indexed to positions corresponding to approximate desired positions of the driven gear, and the exact positioning of the driven gear at each position is achieved by a separate adjustment.

The operation of many types of equipment involves switching apparatus to one of a plurality of possible positions. The possible positions are frequently identified by detents, often regularly spaced. In operation of the equipment, however, it may be found that the detent position does not position the apparatus being switched ideally, for example, a detent type adjustment of an oscillator to achieve desired increments of frequency may only give approximations of the increments.

There is a need, therefore, for means to achieve exact positioning of apparatus which is only approximately or nominally correct when positioned by the usual indexing devices.

This problem of exact adjustment or positioning apparatus becomes compounded when a single driver gear is used to position two similar equipments. If two oscillators instead of the single oscillator mentioned above must have matched outputs, the minor differences in construction and materials which exist require some means of providing individual adjustment.

It is therefore an object of this invention to provide an index type gear train in which the exact positioning of a driven gear or gears can be adjusted.

In a preferred form of the invention, a driver gear is adapted to be moved to positions corresponding to desired positions of a driven gear. These driver gear positions are identified by detents. Mounted about the periphery of the driver gear and projecting from one face are a plurality of regularly spaced pins. The pins act as the teeth or cogs of the driver gear and mesh with corresponding slots or grooves on the driven gear. Each pin has the axis of its projecting portion offset from the axis of the portion mounted in the driver gear. The pins are mounted so that they can be rotated to an angular position with the axis of the projecting portion in line with, or to either side of the radial lines joining the center of the driver gear and the axis of the mounting portion of the pins. The driven gear at each position of the driver gear will assume a position based on the eccentricity of the projecting portion of the pins. The pin for each position is adjusted by rotating it until desired positioning of the driven gear is achieved.

The invention will be better understood from the following description referring to the drawings in which.

Figure 1:
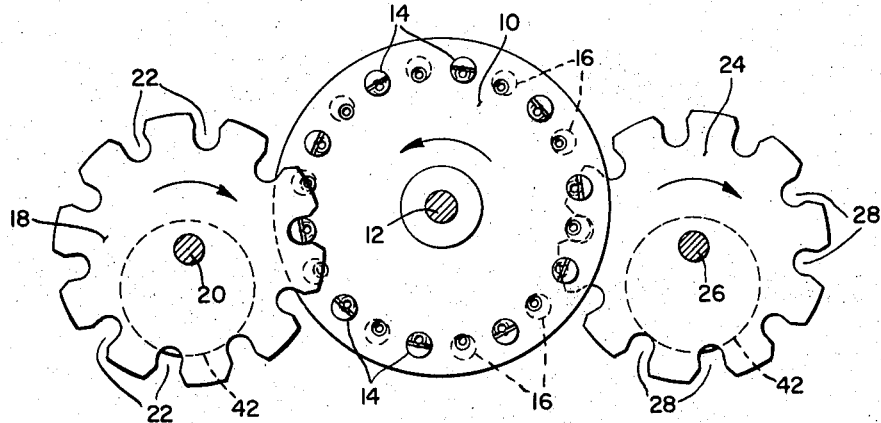
FIGURE 1 is a front elevation of one embodiment of the invention.

Referring to FIGURE 1, driver gear 10 is supported on shaft 12 for rotation. Mounted on driver gear 10 and projecting from the obverse face thereof are a plurality of pins 14. Also mounted on driver gear 10, but projecting from the reverse face thereof are a plurality of pins 16. Driven gear 18 is rotatably supported on shaft 20, and is provided with regularly spaced slots 22 adapted to mesh with pins 14 on driver gear 10. Driven gear 24 is rotatably supported on shaft 26 and is provided with slots 28 adapted to mesh with pins 16 on the reverse side of driver gear 10.

With the axes of the gears spaced as shown it is apparent that rotation of driven gear 10 will cause driven gears 18 and 24 to rotate. It is also apparent a driver gear with a single set of pins could be utilized if only one driven gear was required. For certain applications it may be possible to use a single set of pins to drive two or more driven gears.

Figures 2, 3:
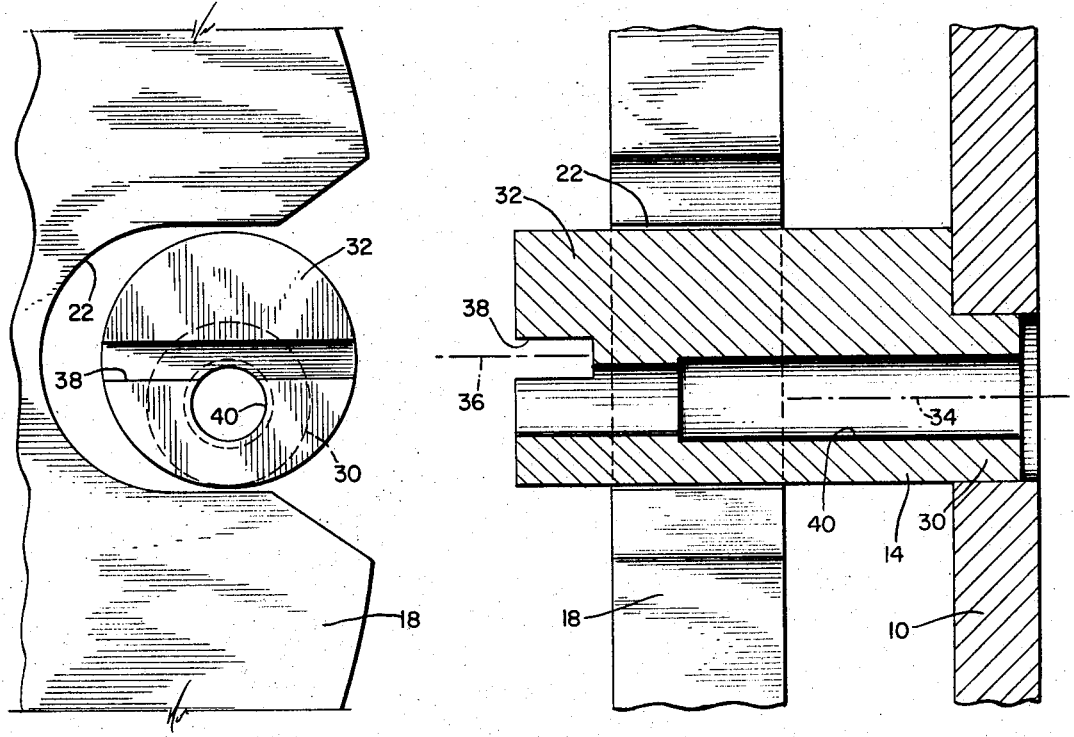
FIGURE 2 is a cross-section of a detail of the embodiment of FIGURE 1.
FIGURE 3 is a front elevation of the detail of FIGURE 2.

Referring next to FIGURES 2 and 3 in which the numerals previously used in FIGURE 1 refer to similar parts, in accordance with the invention pin 14 has a mounting portion 30 and a projecting portion 32. Axis 34 of mounting portion 30 and axis 36 of projecting portion 32 are offset from each other. Pin 14 is mounted in driver gear 10 so that it can be rotated.

Slot 38 is provided for receiving a screwdriver to facilitate rotation of pin 14. Mounting of pin 14 in driver gear 10 may be achieved by tapping hole 40 to receive a screw. In this manner, with the screw loosened, a screwdriver in slot 38 can be used to rotate pin 14 until driven gear 18 is positioned as desired. Then the locking screw is tightened in hole 40 to secure pin 14 in the position desired.

Referring to FIGURE 3, a front elevation of the detail of FIGURE 2, it can be seen that slot 22 in driven gear 18 is cut deeply enough to receive pin 14 no matter what the angular orientation of pin 14.

Pins 16 on the reverse face of driver gear 10 are constructed the same as pins 14. With the apparatus to be controlled completely assembled, driver gear 10 would be successively indexed to each of its positions at which time the pin 14 engaging driven gear 18 would be adjusted, as well as the pin 16 engaging driven gear 24. This adjustment is the angular positioning of the pins as previously described to achieve maximum operation of the equipment connected to the shafts of the driven gears.

Figure 4:
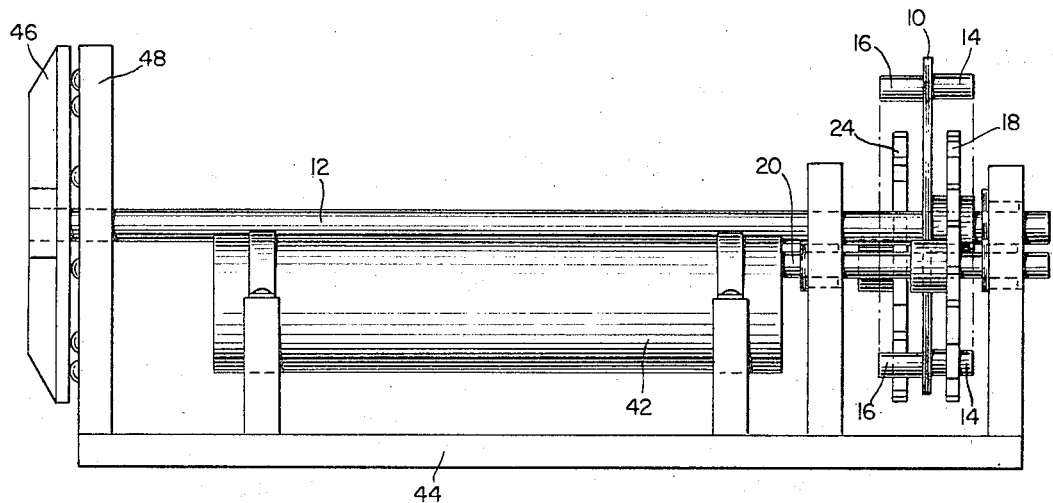
FIGURE 4 is a side elevation of FIGURE 1 additionally showing an example of the application of the invention.

By way of example of the application of this invention, FIGURE 4 illustrates the side view of driver gear 10 and driven gears 18 and 24. Duplicate oscillators 42 (only the oscillator controlled by driven gear 18 is seen in this view) are mounted in supporting structure 44 so that their control shafts 20 and 26 constitute the supporting shafts for driven gears 18 and 24, respectively. Supporting shaft 12 for driver gear 10 extends across the equipment and is secured to control knob 46. Panel 48 against which control knob 46 bears, together with control knob 46 provide a ten-position detent arrangement. The detents are arranged to position driver gear 10 so that axis 34 of the mounting portion 30 of pins 14 and 16 will fall on the imaginary lines connecting the axis of shaft 12 and shafts 20 and 26, respectively. Thus the detents provide nominal positioning of driven gears 18 and 24 for each of the pins 14 and 16. As was previously indicated exact positioning of the driven gears is performed by adjusting the angular position of each of the pins 14 and 16.

Figure 5:
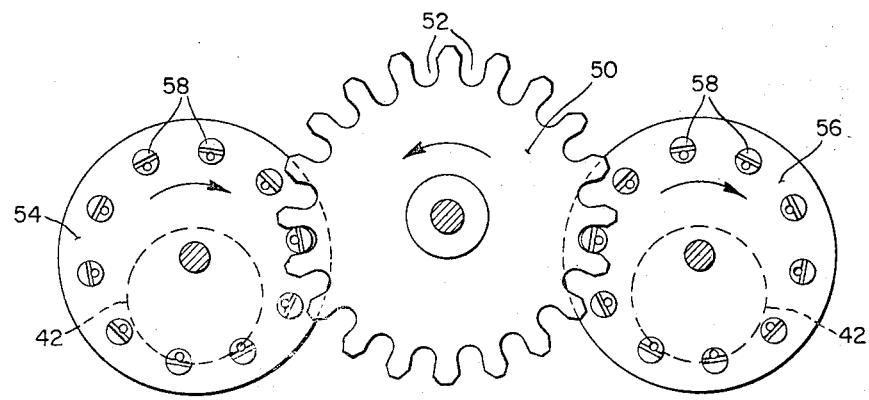
FIGURE 5 is a front elevation of an alternate embodiment of the invention.

Obviously the same result can be achieved by putting the adjustable pins on the driven gear or gears and the slots on the driver gear. FIGURE 5 illustrates this alternate arrangement in which driver gear 50 is provided with slots 52 about its periphery and driven gears 54 and 56 are provided with pins 58 of the type illustarted in FIGURE 2. The same exact positioning of driven gears 54 and 56 can be achieved in this embodiment by adjusting each of the pins 58 while the driven gears are in each of the positions of driver gear 50. It is also possible to have additional driven gears located above and below driver gear 50 with this arrangement.

When a particular embodiment of an adjustable-index gear train has been shown and described, it will be obvious that changes and modifications can be made without departing from the spirit of the invention and the scope of the appended claims.

What is claimed as new and desired to be secured by Letters Patent of the United States is:

1. An adjustable-index gear train comprising:
   a first gear having a plurality of spaced pins rotatably mounted about its periphery and projecting from one one face,
   the axis of the mounting portion of said pins being parallel to but offset from the axis of the projecting portion of said pins, whereby the circumferential location of the projecting portion of said pins on said first gear can be adjusted, within the limits of the offset, by rotating the mounted portion,
   a second gear having a plurality of slots about its periphery,
   said first and second gears having parallel axes spaced so that each slot on the second gear will mesh with a pin on the first gear in a particular rotational position of said first and second gears, whereby the relative angular positions of the two gears can be adjusted at each particular rotational position.

2. An adjustable-index gear train according to claim 1 wherein:
   said first gear is a driver gear and said second gear is a driven gear.

3. An adjustable-index gear train according to claim 2 further comprising:
   a third gear having a plurality of slots about its periphery,
   said third gear being a driven gear,
   said first gear having a second set of a plurality of spaced pins rotatably mounted about its periphery and projecting from the other face, and
   said first and third gears having parallel axes spaced so that each pin of the second set on the first gear will mesh with a slot on the third gear in a particular rotational position of said first and third gears, whereby the relative angular positions of the first and third gears can be adjusted at each particular rotational position.

4. An adjustable-index gear train according to claim 1 wherein:
   said second gear is a driver gear and said first gear is a driven gear.

5. An adjustable-index gear train according to claim 3 further comprising:
   a third gear having a plurality of spaced pins rotatably about its periphery and projecting from one face,
   the axis of the mounting portion of said pins being parallel to but offset from the axis of the projecting portion of said pins, whereby the circumferential location of the projecting portion of said pins on said third gear can be adjusted, within the limits of the offset, by rotating the mounted portion,
   said third gear being a driven gear,
   said second and third gears having parallel axes spaced so that each pin on the third gear will mesh with a slot on the second gear in a particular rotational position of said second and third gears, whereby the relative angular positions of the second and third gears can be adjusted at each particular rotational position.

References Cited

UNITED STATES PATENTS

| | | | |
|---|---|---|---|
| 2,070,777 | 2/1937 | Benbow | 74—415 |
| 3,216,777 | 11/1965 | Allen | 74—415 |

DONLEY J. STOCKING, *Primary Examiner.*

LEONARD H. GERIN, *Examiner.*

UNITED STATES PATENT OFFICE
CERTIFICATE OF CORRECTION

Patent No. 3,377,877

April 16, 1968

Richard H. Eaton

It is certified that error appears in the above identified patent and that said Letters Patent are hereby corrected as shown below:

Column 2, line 9, "driveh" should read -- driver --. column 4, line 12, the claim reference numeral "3" should read -- 4 --; line 14, after "rotatably" insert -- mounted --.

Signed and sealed this 19th day of August 1969.

(SEAL)
Attest:

Edward M. Fletcher, Jr.
Attesting Officer

WILLIAM E. SCHUYLER, JR.
Commissioner of Patents